(12) United States Patent
Hagihara et al.

(10) Patent No.: US 11,534,823 B2
(45) Date of Patent: Dec. 27, 2022

(54) METHOD AND DEVICE FOR HEATING OBJECT TO BE HEATED

(71) Applicant: TAIYO NIPPON SANSO CORPORATION, Tokyo (JP)

(72) Inventors: Yoshiyuki Hagihara, Tokyo (JP); Takayuki Matsumura, Tokyo (JP); Naoki Seino, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 510 days.

(21) Appl. No.: 16/493,056

(22) PCT Filed: Dec. 28, 2017

(86) PCT No.: PCT/JP2017/047183
§ 371 (c)(1),
(2) Date: Sep. 11, 2019

(87) PCT Pub. No.: WO2018/168160
PCT Pub. Date: Sep. 20, 2018

(65) Prior Publication Data
US 2020/0016652 A1    Jan. 16, 2020

(30) Foreign Application Priority Data
Mar. 13, 2017  (JP) .............................. JP2017-047839

(51) Int. Cl.
*B22D 41/015*   (2006.01)

(52) U.S. Cl.
CPC ........ *B22D 41/015* (2013.01); *F23D 2200/00* (2013.01); *F23D 2208/00* (2013.01);
(Continued)

(58) Field of Classification Search
None
See application file for complete search history.

(56) References Cited

U.S. PATENT DOCUMENTS 4,547,150 A * 10/1985 Vereecke ............... F23N 1/022
432/12
4,718,643 A    1/1988 Gitman
(Continued)

FOREIGN PATENT DOCUMENTS

CN        205592955       9/2016
DE     10 2004 037620     2/2006
(Continued)

OTHER PUBLICATIONS

Office Action issued in TW App. No. 106146255 (dated Jan. 12, 2021) (w/ translation).
(Continued)

*Primary Examiner* — Scott R Kastler
(74) *Attorney, Agent, or Firm* — Nixon & Vanderhye P.C.

(57) ABSTRACT

A method and device heat an object to be heated by a flame which is produced by supplying a fuel fluid and a combustion supporting gas to a burner as a heat, source. A temperature rising rate is increased by gradually increasing an oxygen concentration in the combustion supporting gas supplied to the burner and a device for heating an object to be heated including a burner for heating the object to be heated. A flow rate control unit controls a flow rate of a fuel fluid and a combustion supporting gas. A calculation unit transmits combustion information of the burner to the flow rate control unit, and the flow rate control unit increases a temperature rising rate of the object to be heated by increasing the oxygen concentration in the combustion supporting gas supplied to the burner.

10 Claims, 6 Drawing Sheets

(52) U.S. Cl.
    CPC ...... *F23D 2211/00* (2013.01); *F23N 2223/08* (2020.01); *F23N 2235/02* (2020.01); *F23N 2235/16* (2020.01); *F23N 2237/26* (2020.01); *F23N 2237/28* (2020.01); *F23N 2237/32* (2020.01)

(56) References Cited

U.S. PATENT DOCUMENTS

| | | | |
|---|---|---|---|
| 5,871,343 | A | 2/1999 | Baukal et al. |
| 2008/0138751 | A1* | 6/2008 | Kobayashi ............... F23D 14/56 432/9 |
| 2012/0079970 | A1 | 4/2012 | Kaneko |
| 2012/0292833 | A1 | 11/2012 | Wang et al. |
| 2012/0328994 | A1* | 12/2012 | Haneji .................... F23N 1/022 110/297 |
| 2013/0309617 | A1 | 11/2013 | Haneji et al. |

FOREIGN PATENT DOCUMENTS

| | | |
|---|---|---|
| EP | 2 543 929 | 9/2013 |
| JP | 64-23017 | 1/1989 |
| JP | 3-297554 | 12/1991 |
| JP | 4-143047 | 5/1992 |
| JP | 2005-016854 | 1/2005 |
| JP | 2005-035826 | 2/2005 |
| JP | 2007-154215 | 6/2007 |
| JP | 2009-160640 | 7/2009 |
| JP | 2009-532661 | 9/2009 |
| JP | 2011-179751 | 9/2011 |
| JP | 2012-078032 | 4/2012 |
| JP | 2012-154561 | 8/2012 |
| JP | 2015-100823 | 6/2015 |
| WO | 03/083372 | 10/2003 |
| WO | 2007/126980 | 11/2007 |

OTHER PUBLICATIONS

International Search Report for PCT/JP2017/047183 dated Mar. 6, 2018, 4 pages.

Extended European Search Report for Application No. 17900434.6 (dated Dec. 12, 2020), 7 pages.

* cited by examiner

METHOD AND DEVICE FOR HEATING OBJECT TO BE HEATED

This application is the U.S. national phase of International Application No. PCT/JP2017/047183 filed Dec. 28, 2017 which designated the U.S. and claims priority to JP Patent Application No. 2017-047839 filed Mar. 13, 2017, the entire contents of each of which are hereby incorporated by reference.

TECHNICAL FIELD OF THE INVENTION

The present invention relates to a method and a device for heating an object to be heated.

RELATED ART

In a pig iron manufacturing plant or a steel manufacturing plant, a ladle for molten pig iron or a ladle for molten steel (hereinafter sometimes referred to as a ladle or a ladle for molten metal) for transporting the molten pig iron or the molten steel generally maintains the temperature of the molten pig iron or the molten steel housed inside by attaching heat resistant bricks (refractory bricks) on the inner surface thereof.

When pouring the metal pig iron or the molten steel into the ladle, first, the moisture in the refractory of the ladle is removed, and then the inner surface of the ladle is dried and heated (pre-heated) to about 1,000 to 1,400° C. in advance to prevent the temperature drop of the molten pig iron or the molten steel. As a method for drying and heating such a ladle, for example, there is a method for drying and heating using a burner (for example, see Patent Document 1).

Moreover, as a burner used for drying and heating the ladle, in addition to an air burner using air as a combustion supporting gas, a heat storage type burner may be used for the purpose of drying and heating the ladle more effectively (for example, see Patent Documents 2 and 3)

On the other hand, at present, in which global environmental problems are closely highlighted, a method for reducing nitrogen oxides (NOx) in combustion gas by controlling the combustion state when generating a flame with a burner is attracting attention. (for example, see, Patent Document 4).

PRIOR ART LITERATURE

Patent Literature

[Patent Document 1] Japanese Unexamined Patent Application, First Publication No. 2007-154215
[Patent Document 2] Japanese Unexamined Patent Application, First Publication No. 2009-160640
[Patent Document 3] Japanese Unexamined Patent Application, First Publication No. 2015-100823
[Patent Document 4] Japanese Unexamined Patent Application, First Publication No. 2011-179751

DISCLOSURE OF THE INVENTION

Problems to be Solved by the Invention

In the case of preheating the ladle to a predetermined temperature, it is also necessary to consider breakage of the refractory bricks attached in the molten metal container of the ladle. For example, if the temperature of the molten metal container before heating is close to room temperature, rapid heating to bring the inside of the molten metal container to a predetermined temperature may cause the refractory bricks to be broken due to partial thermal expansion. For this reason, when heating the refractory bricks in the molten metal container, it was necessary to combust the burner for a long time so as to heat the inside slowly and uniformly.

However, if it takes too long to preheat the molten metal container, the process time will be increased and the production efficiency will be reduced, so it has been required to perform the preheating in a shorter time.

In addition, when a flame is generated by the burner, carbon dioxide, a trace amount of nitrogen oxide, and the like are inevitably generated. Therefore, there has been a demand for a combustion method which can reduce them as much as possible.

The present invention has been made in view of the above problems, and an object of the present invention is to provide a method and a device for heating an object to be heated such as a molten metal container of the ladle which can uniformly heat in a shorter time than in the prior art, the amount of carbon dioxide, nitrogen oxides (NOx), and the like generated can be significantly reduced, and the object to be heated can be dried and heated efficiently and in an environmentally friendly manner.

Means for Solving the Problem

In order to achieve the object, the present inventors have diligently studied. As a result, the present inventors found that when heating the object to be heated by using the flame of the burner as a heat source, the object to be heated can be heated uniformly in a short time by gradually increasing the oxygen concentration in the combustion supporting gas supplied to the burner. For example, when air is used as the combustion supporting gas, and the oxygen concentration in the combustion supporting gas is increased by gradually adding an oxygen gas to the combustion supporting gas, the oxygen concentration in the combustion supporting gas is 21% by volume (the oxygen concentration in the air) and gradually increases to 100% by volume. The present inventors found that it is possible to significantly reduce the generation of carbon dioxide, nitrogen oxides, and the like, and dry and heat the object to be heated efficiently and in an environmentally friendly manner by using such a method, and the present inventors have completed the present invention.

In other words, the present invention provides the following method and device for heating an object to be heated.

(1) A method for heating an object to be heated by a flame which is produced by supplying a fuel fluid and a combustion supporting gas to a burner as a heat source,
wherein a temperature rising rate is increased by gradually increasing an oxygen concentration in the combustion supporting gas supplied to the burner.

(2) The method for heating an object to be heated according to (1), wherein a combustion state of the burner is a periodic oscillation state by gradually increasing the oxygen concentration in the combustion supporting gas supplied to the burner with periodical changes, periodically changing at least one of a flow rate of the fuel fluid and a flow rate of the combustion supporting gas, periodically changing an equivalent ratio obtained by dividing a total amount of oxygen supplied to the burner by an amount of theoretical oxygen required to combust the fuel fluid completely, and providing a phase difference between the periodic change of the oxygen concentration and the periodic change of the equivalent ratio.

(3) The method for heating an object to be heated according to (2), wherein a phase difference is provided between a periodic change of the flow rate of the fuel fluid and a periodic change of the oxygen concentration and the equivalent ratio.

(4) The method for heating an object to be heated according to any one of (1) to (3), wherein an increase rate of the oxygen concentration in the combustion supporting gas is synchronized with the temperature rising rate of the object to be heated.

(5) The method for heating an object to be heated according to any one of (1) to (4), wherein the object to be heated is a ladle or a tundish used in a steel manufacturing process.

(6) A device for heating an object to be heated used in the method for heating an object to be heated according to any one of (1) to (5), wherein the device includes at least:

a burner which is configured to combust a fuel fluid and a combustion supporting gas to heat an object to be heated:

a flow rate control unit which is configured to control a flow rate of the fuel fluid and the combustion supporting gas supplied to the burner:

a calculation unit which is configured to perform arithmetic processing based on a combustion state of the burner and transmits combustion information to the flow rate control unit, the burner includes at least:

a center supply pipe which is disposed along a central axis of the burner and configured to supply the fuel fluid and a primary oxygen gas: and at least one combustion supporting gas supply pipe which is concentrically arranged around the center supply pipe and configured to supply the combustion supporting gas, the center supply pipe includes:

a primary fuel supply pipe which is disposed on the central axis of the burner;

a secondary fuel supply pipe which is disposed to surround the primary fuel supply pipe, and a primary oxygen gas supply pipe which is disposed to surround the secondary fuel supply pipe, and the flow rate control unit increases a temperature rising rate of the object to be heated by increasing or decreasing a flow rate of the fuel fluid and the combustion supporting gas based on combustion information input from the calculation unit, and gradually increasing an oxygen concentration in the combustion supporting gas supplied to the burner.

(7) The device for heating an object to be heated according to (6), wherein the flow rate control unit controls a combustion state of the burner to be a periodic oscillation state by gradually increasing the oxygen concentration in the combustion supporting gas supplied to the burner while periodically changing at least one of the flow rate of the fuel fluid and the flow rate of the combustion supporting gas, periodically changing an equivalence ratio, which is obtained by dividing a total amount of oxygen supplied to the burner by an amount of theoretical oxygen necessary to completely combust the fuel fluid, and providing a phase difference betweena periodic change of the oxygen concentration and a periodic change of the equivalence ratio.

(8) The device for heating an object to be heated according to (6) or (7), wherein when supplying the fuel fluid to the burner as the primary fuel and the secondary fuel, the flow rate control unit controls supply of the primary fuel to the primary fuel supply pipe at a constant flow rate, and supply of the secondary fuel to the secondary fuel supply pipe such that the flow rate of the secondary fuel is increased.

(9) The device for heating an object to be heated according to (6) or (7), wherein when supplying the fuel fluid to the burner as the primary fuel and the secondary fuel, the flow rate control unit controls supply of the secondary fuel to the secondary fuel supply pipe at a constant flow rate, and supply of the primary fuel to the primary fuel supply pipe such that the flow rate of the primary fuel is increased.

(10) The device for heating an object to be heated according to any one of (6) to (10), wherein an outlet of the primary oxygen gas supply pipe is disposed at a position projecting in the flame ejection direction from an outlet of the primary fuel supply pipe and the secondary fuel supply pipe of the center supply pipe in the burner.

(11) The device for heating an object to be heated according to any one of (6) to (10), wherein air and a secondary oxygen are supplied as the combustion supporting gas to the combustion supporting gas supply pipe in the burner.

Advantageous Effects of Invention

According to the method for heating an object to be heated of the present invention, it is possible to heat the object to be heated uniformly in a short time by adopting a method for gradually increasing the oxygen concentration in the combustion supporting gas supplied to the burner, and increasing the temperature rising rate of the object to be heated. As a result, the generation of carbon dioxide and nitrogen oxides (NOx) can be significantly reduced, and it is possible to heat the object to be heated efficiently and in an environmentally friendly manner.

According to the device for heating an object to be heated of the present invention, since the device includes an arithmetic processing unit which is configured to arithmetically process the combustion state of the burner, and the flow rate control unit which is configured to gradually increase the oxygen concentration in the combustion supporting gas supplied to the burner and increase the temperature rising rate of the object to be heated, similar to the method above, the object to be heated can be heated uniformly in a short time. As a result, the generation of carbon dioxide and nitrogen oxides (NOx) can be significantly reduced, and a device which can dry and heat the object to be heated efficiently and in an environmentally friendly manner can be provided.

Therefore, when the method and the device for heating an object to be heated according to the present invention are used, for example, to preheat a molten pig iron pan and a molten steel pan (ladle) for transporting the molten pig iron or the molten steel in a pig iron manufacturing plant or a steel manufacturing plant, it is possible to dry and heat them efficiently and in an environmentally friendly manner without damage to the refractory bricks provided on the inner surface of the ladle. For this reason, the present invention is very suitable for such applications.

EMBODIMENTS OF THE INVENTION

Hereinafter, a method and a device for heating an object to be heated according to one embodiment of the present invention will be described with reference to FIGS. 1 to 6 as appropriate. In the drawings used in the following description, in order to make the features easy to understand, the features may be enlarged for the sake of convenience, and the dimensional ratio of each component may be limited to the same as the actual one. In addition, the materials and the like exemplified in the following description are merely examples, and the present invention is not limited thereto, and can be appropriately changed and implemented without changing the gist of the invention.

The method and the device for heating an object to be heated according to the present invention can be used, for example, in preheating a ladle for molten metal or a tundish used for transporting a molten pig iron or a molten steel in a plant for manufacturing pig iron or steel. In the present embodiment, a case of using a ladle 10 for molten metal shown in FIG. 1 as an object to be pre-dried will be described as an example.

<Object to be Heated (Ladle for Molten Metal)>

The ladle 10 for molten metal to be heated in the present embodiment is a container used for transporting the molten pig iron or the molten steel. The upper portion of the container main body 11 is an opening 11a. Further, refractory bricks (not shown in figures) are attached on the inner surface 11b of the container main body 11 to maintain the temperature of the molten pig iron or the molten steel. Further, the opening 11a, which is the upper part of the container main body 11 of the ladle 10 for molten metal shown in FIG. 1, is covered with a furnace cover 12 provided with a burner 3 and a temperature measuring unit 6 which are equipped with a heating device 1 explained below.

<Device for Heating Object to be Heated>

Figure 1:
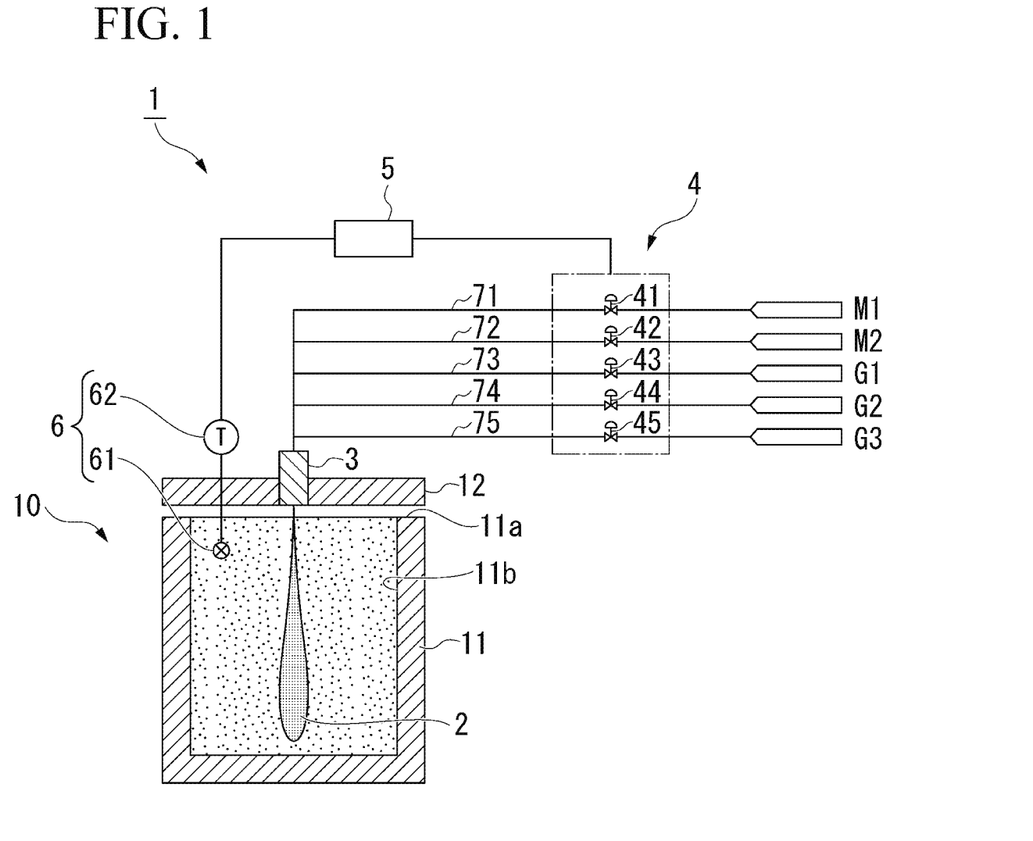
FIG. 1 is a figure for typically illustrating one embodiment of the method and the device for heating an object to be heated according to the present invention, and is a schematic diagram for showing one example of the device for heating a ladle for molten metal as an object to be heated.

As shown in FIG. 1, the device 1 for heating an object to be heated of the present embodiment generally includes the burner 3 which is configured to combust a fuel fluid (a primary fuel M1 and a secondary fuel M2) and a combustion supporting gas G3, and forms a flame 2 in the ladle 10 for molten metal, and heats the ladle 10 for molten metal which is an object to be heated; a flow rate control unit 4 which is configured to control a flow rate of each of the primary fuel M1, the secondary fuel M2, the combustion supporting gas G3 and an oxygen gas (a primary oxygen gas G1 and a secondary oxygen gas G2) supplied to the burner 3; and a calculation unit 5 which is configured to perform calculation processing based on a temperature measured by the temperature measuring unit 6, and send the result as flow information to the flow rate control unit 4.

The burner 3 heats the inner surface 11b of the ladle 10 for molten metal by forming the flame 2, The burner 3 shown in figures is attached to the furnace cover 12 constituting the ladle 10 for molten metal so that the jet direction of the flame 2 is vertically downward, that is, the flame 2 is formed inside the container main body 11. The burner 3 snakes the flame 2 by supplying the primary fuel M1, the secondary fuel M2, the combustion supporting gas G3, the primary oxygen G1, and the secondary oxygen G2 through the pipes 71, 72, 73, 74, and 75, respectively, of which the flow rate is controlled by the flow rate control unit 4.

Figure 3:
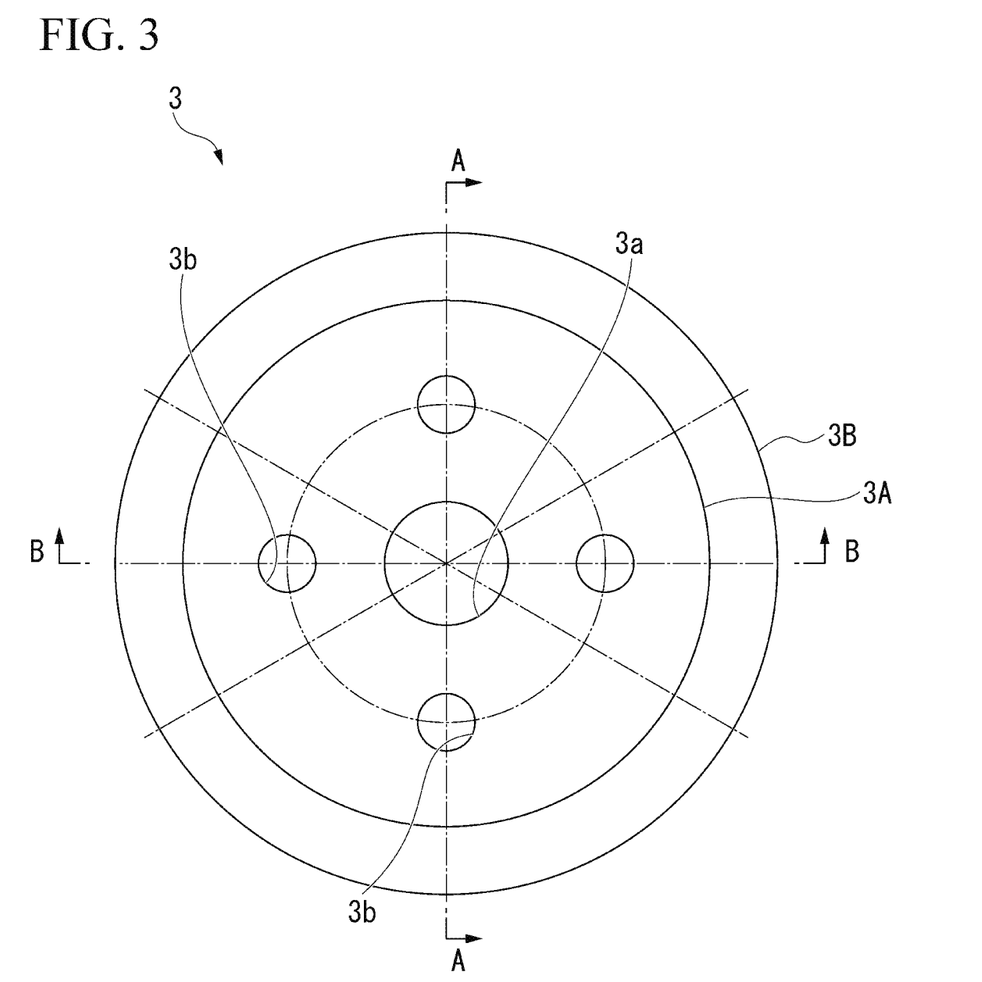
FIG. 3 is a figure for typically illustrating one embodiment of the method and the device for heating an object to be heated according to the present invention, and is a planner view for showing an example of the burner in the heating device shown in FIG. 1.
Figure 4:
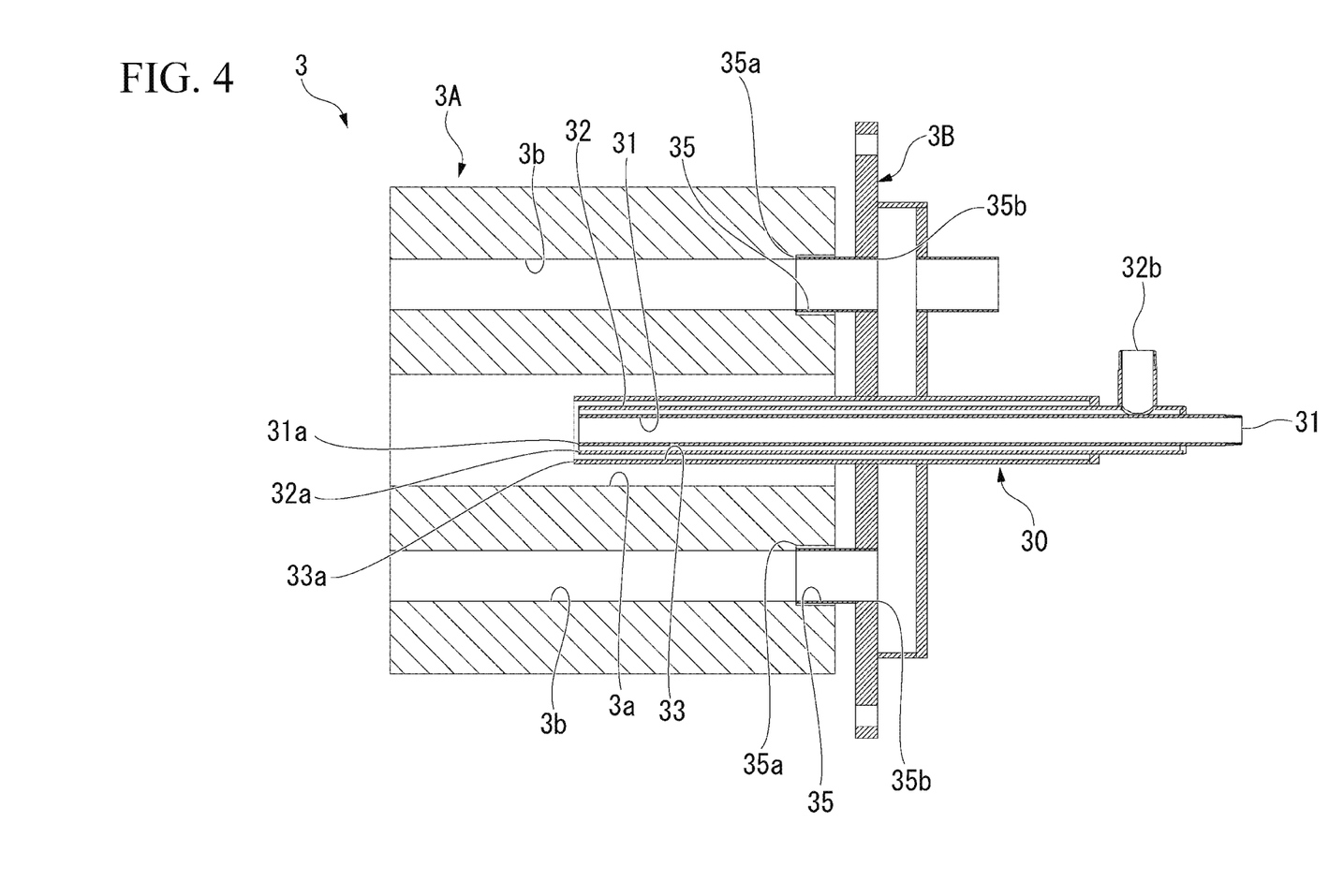
FIG. 4 is a figure for typically illustrating one embodiment of the method and the device for heating an object to be heated according to the present invention, and is a cross sectional view for showing the burner shown in FIG. 3 taken along the line A-A.
Figure 5:
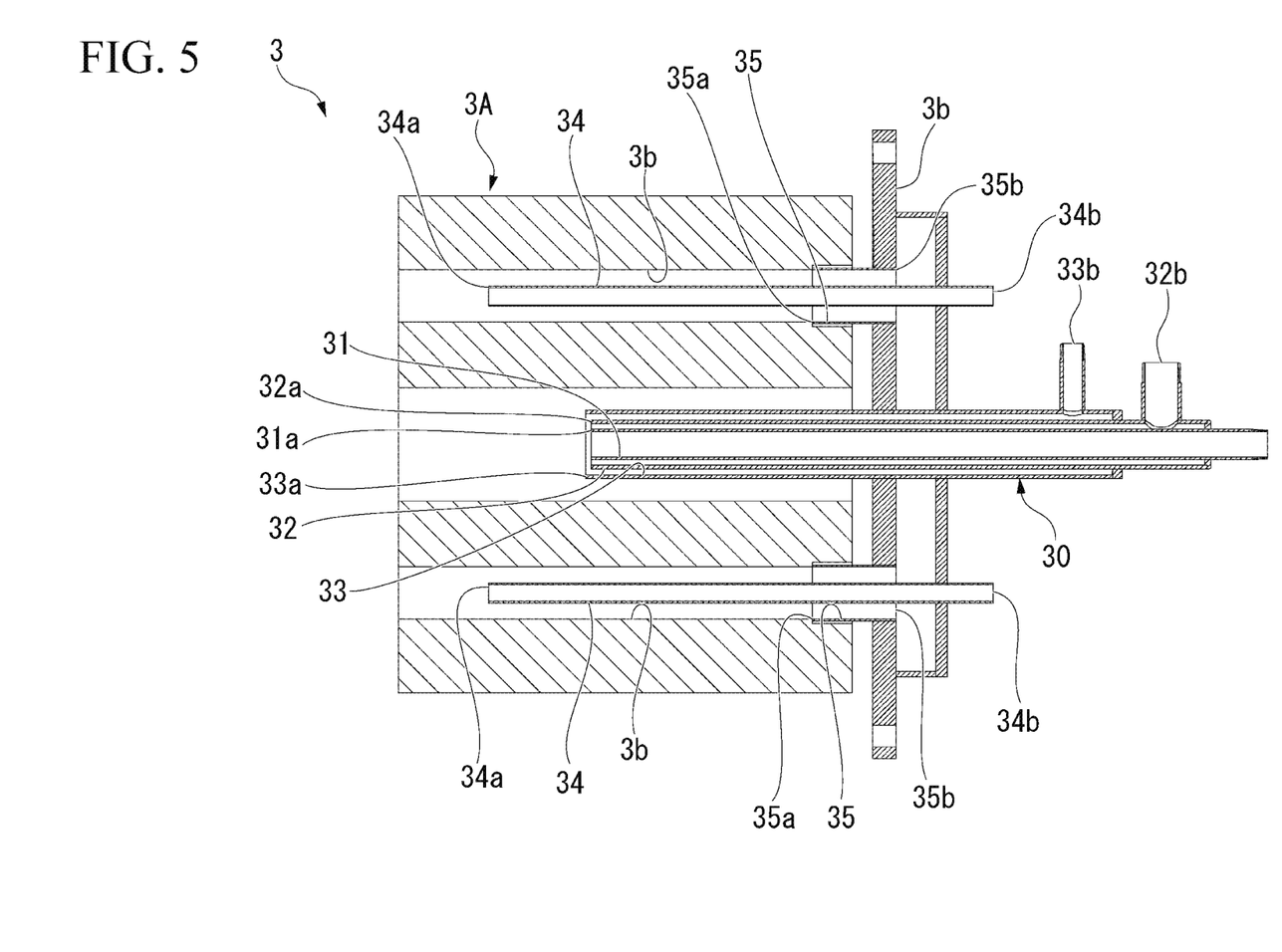
FIG. 5 is a figure for typically illustrating one embodiment of the method and the device for heating an object to be heated according to the present invention, and is a cross sectional view for showing the burner shown in FIG. 3 taken along the line B-B.

More specifically, as shown in the plan view of FIG. 3, the cross sectional view of FIG. 4 (cross sectional view in the case of cutting along the line A-A in FIG. 3) and cross sectional view of FIG. 5 (cross sectional view in the case of cutting along the line B-B in FIG. 3), the burner 3 of the present embodiment includes a center supply pipe 30 which is disposed along the central axis of the burner 3 and is configured to supply the primary fuel M1, the secondary fuel M2, and the primary oxygen gas G1, and at least one combustion supporting gas supply pipe 35 which is configured to supply the combustion supporting gas G3. In the figures four combustion supporting gas supply pipes 35 are concentrically arranged around the center supply pipe 30.

Further, the burner 3 shown in figures further includes a burner block 3A which is formed to extend in the flame ejection direction of the center supply pipe 30 and the combustion supporting gas supply pipe 35, and provided with flow paths each of which leads the flame and gasses to the outside. In other words, a flow path 3a for accommodating the center supply pipe 30 is formed along the central axis of the burner 3 and a total of four flow paths 3b for accommodating the combustion supporting gas supply pipe 35 (and a secondary oxygen gas supply pipe 34 described later) are formed concentrically in the burner block 3A. The center supply pipe 30, the combustion supporting gas supply pipe 35, and the burner block 3A are integrally fixed by a burner block fixing jig 3B.

The center supply pipe 30 has a triple pipe structure in which a primary fuel supply pipe 31, a secondary fuel supply pipe 32, and a primary oxygen gas supply pipe 33 are concentrically arranged in the outward direction from the central axis. As a result, the inside of the primary fuel supply pipe 31 is a flow path of the primary fuel M1, the space between the primary fuel supply pipe 31 and the secondary fuel supply pipe 32 is a flow path of the secondary fuel M2, and the space between the secondary fuel supply pipe 32 and the primary oxygen gas supply pipe 33 is a flow path for the primary oxygen gas G1.

The primary fuel M1 is supplied to the primary fuel supply pipe 31 by connecting the supply port 31b with a pipe 71 shown in FIG. 1, The secondary fuel M2 is supplied to the secondary fuel pipe 32 by connecting the supply port 32b with a pipe 72 shown in FIG. 1. Further, the primary oxygen gas G1 is supplied to the primary oxygen gas supply pipe 33 by connecting the supply port 33b with a pipe 73 as shown in FIG. 1.

The primary fuel M1 is ejected from an outlet 31a which is the tip end of the primary fuel supply pipe 31 toward a flow path 3a in which the center supply pipe 30 is accommodated. The secondary fuel M2 is ejected from an outlet 32a of the secondary fuel supply pipe 32 toward the flow path 3a in which the center supply pipe 30 is accommodated. In addition, the primary oxygen gas G1 is ejected from an outlet 33a which is the tip end of the primary oxygen gas supply pipe 33 toward the flow path 3a.

In the center supply pipe 30 shown in figures, the outlet 31a of the primary fuel supply pipe 31 and the outlet 32a of the secondary fuel supply pipe 32 are disposed on the same plane. On the other hand, the outlet 33a of the primary oxygen gas supply pipe 33 is disposed at a position projecting more than the outlets 31a and 32a in the flame ejection direction.

Further, although detailed illustration is omitted in FIGS. 3 to 5, when the burner 3 is planarly viewed, the outlet 31a of the primary fuel supply pipe 31, the outlet 32a of the secondary fuel supply pipe 32, and the outlet 33a of the primary oxygen supply pipe 33 are each formed in a ring shape in the center supply pipe 30.

In the present embodiment, as described above, even when the flow velocity of the fuel changes significantly, the flow velocity of the fuel is adjusted within a certain range and suppresses the occurrence of variation by configuring the fuel supply pipe provided in the center supply pipe 30 in a double manner. On the other hand, when the fuel supply pipe is configured as one pipe, for example, if the flow rate of the fuel fluid is reduced and the flow velocity becomes extremely low, the flame length may be shortened, or the combustion may become unstable.

Further, in the present embodiment, as described above, the outlet 33a from which the primary oxygen gas G1 is ejected is disposed at a position projecting in the flame ejection direction from the outlets 31a and 32a from which the primary fuel M1 and the secondary fuel M2 are respectively ejected. For this reason, the flame 2 formed by the fuel fluids M1, M2 and the primary oxygen gas G1 can be formed with high combustion efficiency.

At least one combustion supporting gas supply pipe 35 is disposed parallel to the central axis of the burner 3 and arranged around the center supply pipe 30. In the example shown in FIG. 4 or the like, the combustion supporting gas supply pipes 35 are arranged concentrically at four points. Thereby, the gas flow paths for the combustion supporting gas G3 are formed around center supply pipe 30. In the present embodiment, the combustion supporting gas G3 is supplied to the combustion supporting gas supply pipe 35 by connecting the pipe 75 to the suction port 35b of the combustion supporting gas supply pipe 35. The combustion supporting gas supply pipes 35 ejects the combustion supporting gas G3 from the outlets 35a having a circular shape in a planar view, which is the tip end of flow path, toward the inside of the flow path 3b formed in the burner block 3A. Moreover, as shown in figures, when the burner 3 is planarly viewed, four outlets 35a of the combustion supporting gas supply pipe 35 are each arranged equally at circumferential shape.

Furthermore, as shown in the cross-sectional view of FIG. 5 (cross sectional view in the case of cutting along the line B-B in FIG. 3), the burner 3 is provided with secondary oxygen gas supply pipes 34 for supplying the secondary oxygen gas G2 which are inserted into two opposing combustion supporting gas supply pipes 35 with respect to the central axis of the burner 3 among the four combustion supporting gas supply pipes 35. Similar to the combustion supporting gas supply pipes 35, the secondary oxygen gas supply pipes 34 are formed parallel and concentrically with respect to the central axis of the burner 3. The secondary oxygen gas G2 is supplied to the secondary oxygen gas supply pipe 34 by connecting a pipe 74 to the supply port 34a, which is the tip end of the flow path. The secondary oxygen gas G2 is ejected from the outlet 34a, which is the tip end of the secondary oxygen gas supply pipe 34, toward the flow path 3b in which the combustion supporting gas supply pipe 35 and the secondary oxygen gas supply pipe 34 are accommodated. Although detailed illustration is omitted in FIG. 5, when the burner 3 is planarty viewed, the total of two outlets 34a of the secondary oxygen gas supply pipe 34 are formed equally circumferentially similar to the combustion supporting gas supply pipe 35.

In FIGS. 4 and 5 (see also FIG. 3), the secondary oxygen gas supply pipe 34 is provided in only two of the combustion supporting gas supply pipes 35 provided in a total of four places. However, it is not limited to this embodiment. For example, the secondary oxygen gas supply pipe 34 may be provided inside all of the combustion supporting gas supply pipes 35 provided at four locations.

Furthermore, the number of the combustion supporting gas supply pipe 35 and the secondary oxygen gas supply pipe 34 may be, for example, six or eight. The number of installations and the installation positions can be appropriately determined taking into consideration that the strength of the burner block 3A can be maintained, and the like.

By adopting the configuration provided with the secondary oxygen gas supply pipe 34 as described above, it is possible to add the secondary oxygen gas G2 to the combustion supporting gas G3 inside the combustion supporting gas supply pipe 35. As a result, the oxygen concentration in the combustion supporting gas G3 can be appropriately adjusted. For example, the combustion supporting gas G3 can be supplied while adjusting the oxygen concentration in a range of 21% by volume to 100% by volume.

Although the method for adjusting the oxygen concentration in the combustion supporting gas G3 will be described later, when the secondary oxygen gas supply pipe 34 is not disposed in the combustion supporting gas supply pipe 35, for example, the supply of the combustion supporting gas G3 from the combustion supporting gas supply pipe 35 is stopped as necessary. That is, the oxygen concentration can be increased to 100% by volume by appropriately reducing or stopping the supply of combustion supporting gas (33 in the combustion supporting gas supply pipe 35 in which the secondary oxygen gas supply pipe 34 is not disposed as shown in FIG. 4, As shown in FIGS. 3 to 5, the outlet 33a of the primary oxygen gas supply pipe 33 surrounds the outlet 31a of the primary fuel feed pipe 31 and the outlet 32a of the secondary fuel feed pipe 32 together with the burner block 3A in the burner 3. In addition, the outlets 35a of the four combustion supporting gas supply pipes 35 are arranged concentrically around the outlet 32a of the secondary fuel supply pipe 32.

Therefore, when the burner 3 is combusted, first, the fuel fluid (the primary fuel M1 and the secondary fuel M2) ejected from the outlets 31a and 32a and the primary oxygen gas G1 ejected from the outlet 33a are mixed, and the flame is formed so as to eject from the flow path 3a. In the burner 3, the combustion supporting gas G3, which is air, is ejected from the four outlets 35a. Furthermore, the stable flame 2 can be formed by combustion supporting gas (33 ejecting from the flow path 3b and acting on the flame In the configurations above, the nozzle arrangement, and the arrangement, the shape, the angle, the number, and the like of the outlets in the burner may be appropriately set without departing from the present invention.

As described above, the burner 3 in the heating device 1 of the present embodiment is provided with the primary oxygen gas supply pipe 33 disposed around the secondary fuel supply pipe 32. As a result, the ignition property in the vicinity of the outlets 31a and 32a, from which the primary fuel M1 and the secondary fuel M2 are jected, is improved. This can contribute to the formation of the stable flame 2.

In the burner 3, as described above, the outlets 35a for ejecting the combustion supporting gas G3 are circumferentially arranged at four locations so as to surround the outlet 31a and the outlet 32a from which the primary fuel M1 and the secondary fuel M2 are ejected and the outlet 33a from which the primary oxygen gas is ejected via the burner block 3A. As a result, the combustion supporting gas G3 ejected from the outlet 35a works well on the flame, and the stable flame 2 can be formed. Furthermore, when a gas with an increased oxygen concentration which is obtained by adding the secondary oxygen gas G2 is suppled as the combustion supporting gas G3, the combustion supporting gas G3 rich in molecular oxygen works better on the flame, and the more stable flame 2 can be formed. At the same time, it becomes possible to uniformly heat the object (ladle 10 for molten metal) to be heated to a high temperature range.

As described above, the flow rate control unit 4 supplies the fuel and each gas to each pipe of the burner 3 while controlling the flow rate of each of the primary fuel M1, the secondary fuel M2, the combustion supporting gas G3, the primary oxygen gas G1, and the secondary oxygen gas G2.

The flow rate control unit 4 provided in the heating device 1 of the present embodiment controls the increase or decrease of the flow rate of the fuel fluid M1, M2 and the combustion supporting gas G3 supplied to the burner 3 based on the combustion information input from the calculation unit 5 described later. As a result, the flow rate control unit 4 controls the gradual increase of the oxygen concentration in the combustion supporting gas G3 supplied to the burner 3 and the increase of the temperature rising rate of the ladle 10 for molten metal, which is the object to be heated.

The flow rate control unit 4 internally has a plurality of on-off valves 41, 42, 43, 44, 45.

The on-off valve 41 controls the flow rate of the primary fuel M1 supplied to the primary fuel supply pipe 31 of the burner 3 via the pipe 71. The on-off valve 42 also controls the flow rate of the secondary fuel M2 supplied to the secondary fuel supply pipe 32 of the burner 3 via the pipe 72. The on-off valve 43 controls the flow rate of the primary oxygen gas G1 supplied to the primary oxygen gas supply pipe 33 of the burner 3 via the pipe 73. The on-off valve 44 controls the flow rate of the secondary oxygen gas G2 supplied to the secondary oxygen gas supply pipe 34 of the burner 3 via the pipe 74. The on-off valve 45 controls the flow rate of the combustion supporting gas G3 supplied to the combustion supporting gas supply pipe 35 of the burner 3 via the pipe 75.

The primary fuel M1 and the secondary fuel M2 supplied as the fuel fluid from the flow rate control unit 4 toward the burner 3 are not particularly limited as long as they are suitable as a fuel for the burner 3. For example, in addition to liquefied natural gas (LNG), liquefied petroleum gas (LPG), butane gas, etc. can be used as the primary fuel M1 and the secondary fuel M2.

In addition, it is preferable to use pure oxygen as the primary oxygen gas G1 and the secondary oxygen gas G2 supplied from the flow rate control unit 4 toward the burner 3. However, pure oxygen having a purity of 100% by volume is disadvantageous in terms of the cost in industrial production, so it is not necessary to be 100% by volume of pure oxygen. Optionally, a gas having a desired oxygen concentration may be used, for example, an oxygen-enriched gas having an oxygen concentration of approximately 90% by volume or more may be used.

In addition, as the combustion supporting gas G3 supplied from the flow rate control unit 4 toward the burner 3, for example, air taken in from the atmosphere can be used, and additionally, the secondary oxygen gas G2 can be added. In addition, as the combustion supporting gas G3, a gas containing oxygen molecules, that is, air can be typically used. However, a gas having an adjusted oxygen concentration by adding the secondary oxygen gas G2 to air is used as described above in this embodiment.

In addition, it is preferable that the flow rate control unit 4 further have the following functions in the heating device 1 of this embodiment.

For example, the flow rate control unit 4 may control the gradual increase of the oxygen concentration in the combustion supporting gas G3 supplied to the burner 3 while periodically changing, and periodically change at least one of the flow rate of the primary fuel M1 and the secondary fuel M2 and the flow rate of the combustion supporting gas G3.

In addition, the flow rate control unit 4 may control the periodical change of an equivalence ratio, which is obtained by dividing the total amount of the oxygen supplied to the burner 3 by an amount of theoretical oxygen necessary to completely combust the primary fuel M1 and the secondary fuel M2, to provide a phase difference between the periodic change of the oxygen concentration and the periodic change of the equivalence ratio, whereby the combustion state of the burner 3 may be periodically oscillated.

Alternatively, the flow rate control unit 4 may be configured to change the flow rates of the primary fuel M1 and the secondary fuel M2 and the flow rate of the combustion supporting gas G3 independently.

As described above, as a method for periodically oscillating the combustion state of the burner 3 by periodically changing the flow rate of the fuel fluid or the combustion supporting gas G3 or periodically changing the total amount of oxygen supplied to the burner 3, for example, there is a method for changing each flow rate by opening and closing each on-off valve 41, 42, 43, 44, 45 provided in the flow rate control unit 4.

In addition, when primary fuel M1 and secondary fuel M2 are supplied to the burner 3, the flow rate control unit 4 may supply the primary fuel M1 to the primary fuel supply pipe 31 at a constant flow rate, and increase or decrease the flow rate of the secondary fuel M2 supplied to the secondary fuel supply pipe 32.

Alternatively, when the primary fuel M1 and the secondary fuel M2 are supplied to the burner 3, the flow rate control unit 4 may supply the secondary fuel M2 to the secondary fuel supply pipe 32 at a constant flow rate, and increase or decrease the flow rate of the primary fuel M1 supplied to the primary fuel supply pipe 31.

The calculation unit 5 performs an arithmetic processing based on the temperature measurement value in the ladle 10 for molten metal, which is measured by the temperature measuring unit 6 installed in the ladle 10 for molten metal described later, and outputs the result to the flow rate control unit 4 as information on the combustion state of flame 2 inside the ladle 10 (furnace) for molten metal.

The temperature measuring unit 6 is installed in the ladle 10 for molten metal as described above, measures the temperature in the furnace, and transmits the temperature value to the calculation unit 5. As the temperature measuring unit 6, for example, a temperature detecting device such as a thermocouple can be used without any limitation.

In addition, in this embodiment, in order to respond to the state in the ladle 10 for molten metal timely, a detector (not shown) other than the temperature measuring unit 6 may be arranged in the ladle 10 for molten metal. Moreover, a sequence program may be provided, which grasps the situation in the ladle 10 for molten metal based on the data detected by the detector and automatically changes the flow rate of the fuel fluid, the oxygen gas, or the combustion supporting gas as appropriate.

In the present embodiment, heating the ladle 10 for molten metal is started from a state where the oxygen concentration is low, and the oxygen concentration is gradually increased according to the temperature rise of the inner wall of ladle 10 for molten metal. As a result, the temperature rise rate can be gradually increased, and the ladle 10 for molten metal can be efficiently heated.

In addition, it is possible to suppress the generation of nitrogen oxides (NOx) in the combustion exhaust gas by periodically changing the oxygen concentration and the oxygen ratio and further providing a phase difference to the periodic changes.

<Method for Heating Object to be Heated>

As the method for heating an object to be heated according to the present embodiment, an example in which the ladle 10 for molten metal which is used to transport the molten pig iron or the molten steel is preheated using the heating device 1 shown in FIG. 1 (see also burner 3 shown in FIGS. 3 to 5) is described in detail below.

The method for heating an object to be heated of this embodiment is a method in which the primary fuel M1 and the secondary fuel M2 (fuel fluid) and the combustion supporting gas G3 are supplied to the burner 3 and heat the ladle 10 for molten metal, which is the object to be heated using the flame 2 formed as a heat source. In the present embodiment, the temperature rising rate of the ladle 10 for molten metal, which is the object to be heated, is increased by gradually increasing the oxygen concentration in the combustion supporting gas G3 supplied to the burner 3. In the following example, a method will be described in which, when the ladle 10 for molten metal is cooled at room temperature, the ladle 10 for molten metal is heated by using air as the combustion supporting gas G3, and the secondary oxygen gas G2 is added to the combustion supporting gas G3 to gradually increase the oxygen concentration.

[Procedure for Heating Object to be Heated]

As shown in FIG. 1, when heating the ladle 10 for molten metal, which is the object to be heated by the method for heating of the present embodiment, the inner surface 11b of the container main body 11 of the ladle 10 for molten metal is heated by the flame 2 formed by the burner 3 attached to the furnace cover 12. At this time, the flame 2 formed by the burner 3 extends vertically downward and uniformly heats the entire inner surface 11b.

The burner 3 can form the flame 2 which is most suitable for heating the ladle 1 for molten metal by supp g the primary fuel M1, the secondary fuel M2, the combustion supporting gas G3, the primary oxygen G1, and the secondary oxygen G2 of which the flow rate is controlled by a method described below from the flow rate control unit 4.

[Control of Supply Amount of Fluid Fuel, Oxygen Gas and Combustion Supporting Gas]

As described above, the present inventors found that when heating the object be heated by using the flame of the burner 3 as a heat source, the object to be heated can be heated uniformly in a short time by gradually increasing the oxygen concentration in the combustion supporting gas G3 supplied to the burner 3, and have completed the present invention.

Figure 2:
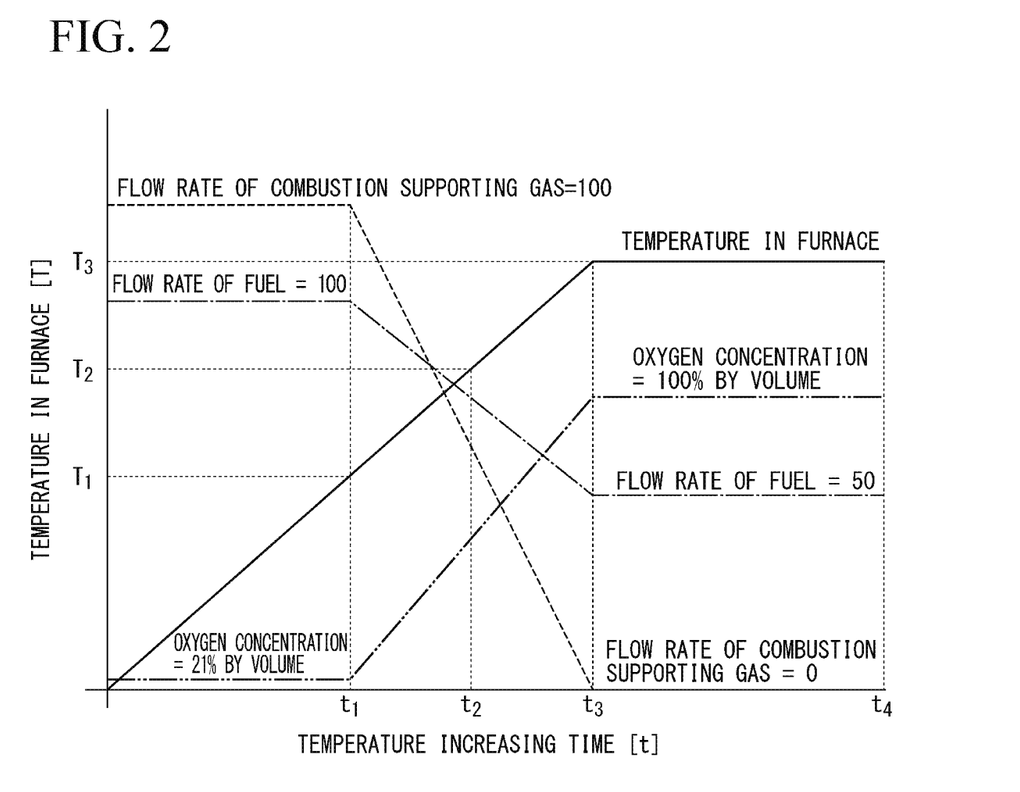
FIG. 2 is a figure for typically illustrating one embodiment of the method and the device for heating an object to be heated according to the present invention, and is a graph for showing a relationship between a temperature in a furnace, and a temperature rising time when changing a flow rate of a fuel fluid and a combustion supporting gas, and an oxygen concentration in the combustion supporting gas.

The graph in FIG. 2 shows the relationship between the temperature (T) of the ladle 10 for molten metal and the temperature rising time (t) when the flow rate of the fuel fluid (the primary fuel M1 and the secondary fuel M2) and the combustion supporting gas G3, and the oxygen concentration in the combustion supporting gas 3 are changed.

In the method for heating an object to be heated of the present embodiment, it is possible to increase the oxygen concentration in combustion supporting gas G3 supplied to the burner 3 by using air containing oxygen molecules as the combustion supporting gas G3, and adding gradually the secondary oxygen gas G2 to the combustion supporting gas G3. That is, as shown in the graph of FIG. 2, when air is used as the combustion supporting gas G3, the oxygen concentration in the combustion supporting gas G3 is about 21% by volume (the oxygen concentration in the air). Then, the oxygen concentration in combustion supporting gas G3 gradually increases from about 21% by volume at the start of combustion to finally about 100% by volume by gradually adding the secondary oxygen gas G2 to the combustion supporting gas G3. Here, when the combustion supporting gas G3 is combusted in a state in which the oxygen concentration is 21% by volume, the supply amount of the secondary oxygen gas G2 is 0 (zero). On the other hand, when the supply amount of the secondary oxygen gas G2 is gradually increased to 100% by volume of oxygen, the supply amount of the gas other than oxygen originally contained in the combustion supporting gas G3 becomes 0 (zero).

In the method for heating an object to be heated of the present bodiment, first, the primary fuel M1 and the secondary fuel M2, and the combustion supporting gas G3 in an amount necessary to combust the fuel fluids are supplied to the burner 3 to form the flame 2. The oxygen concentration in the combustion supporting gas G3 at this time is about 21% by volume as shown in the graph of FIG. 2.

The heat transfer efficiency from the flame 2 to the ladle 10 for molten metal largely depends on the temperature difference between the flame 2 and the ladle 10 for molten metal, which is the object to be heated. Therefore, when the combustion conditions of the burner 3 are constant, that is, when the oxygen concentration in the combustion supporting gas G3 and the supply amount of the fuel fluid are constant, the temperature of the ladle 10 for molten metal rises from room temperature to T1 (within the temperature rising time t=0 to ti in the graph of FIG. 2). On the other hand, as the temperature of the ladle 10 for molten metal increases, the heat transfer efficiency decreases.

Therefore, in the present embodiment, the secondary oxygen gas G2 is added to the combustion supporting gas G3 with the temperature rise in the ladle 10 for molten metal by heating using flame 2 formed by burner 3, and the amount of the secondary oxygen gas G2 supplied is gradually increased. As the oxygen concentration in the combustion supporting gas G3 increases, the combustion temperature of the flame 2 formed by the burner 3 also gradually increases the temperature rising time t=t1 to t2 shown in the graph of FIG. 2), Along with this, the temperature of the ladle 10 for molten metal also rises in the range of the temperature T1 to T2 shown in the graph of FIG. 2.

By adopting such a method, when the ladle 10 for molten metal is cold, the temperature of the flame 2 by the burner 3 can be lowered, and then the flame temperature can be gradually raised. Thereby, a local and rapid temperature rise in the ladle 10 for molten metal can be prevented.

When the temperature in the ladle 10 for molten metal rises to a predetermined temperature, for example, 1,200° C., it is preferable to further increase the flame temperature (within temperature increasing time t=$t_2$ to $t_3$ shown in the graph of FIG. In this case, the amount of the secondary oxygen gas G2 added to the combustion supporting gas G3 is increased, and finally, the entire amount of the gas supplied to burner 3 as the combustion supporting gas G3 is replaced with oxygen (within temperature increasing time t=$t_3$ to $t_4$ shown in the graph of FIG. 2). The temperature of the ladle 10 for molten metal at this time rises to the temperature T3 shown in the graph of FIG. 2.

As described above, when the gas supplied to the combustion supporting gas supply pipe 35 of the burner 3 is gradually replaced with oxygen by adding the secondary oxygen gas G2 to the combustion supporting gas G3, nitrogen or argon contained in air which does not contribute to the combustion decreases. For this reason, the amount of the combustion exhaust gas which carries a heat quantity out of the ladle 10 for molten metal also decreases. This has the effect of reducing the amount of the fuel fluid supplied to obtain the unit heat quantity. In the example shown in the graph of FIG. 2, assuming that the flow rate of the fuel fluid (the primary fuel M1 and the secondary fuel M2) at the start of the combustion is 100, the flow rate of the fuel fluid When the oxygen concentration of the combustion supporting gas G3 is increased to 100% by volume is reduced to half, 50.

On the other hand, when a general burner is used, the flame length of the burner tends to be shortened as the fuel flow rate is reduced. When the flame is in such a state, a problem arises in that not only the region far from the burner in the ladle for molten metal cannot be sufficiently heated, but also it becomes difficult to uniformly heat the entire ladle for molten metal.

Therefore, in the present embodiment, when the oxygen concentration in the combustion supporting gas G3 supplied to the burner 3 is gradually increased, it is preferable that at least one of the flow rate of the entire fuel fluid (the primary fuel M1 and the secondary fuel M2) supplied to the burner 3 and the flow rate of the combustion supporting gas G3 be changed periodically. At the same time, it is also preferable that the oxygen concentration contained in the combustion supporting gas G3 supplied to the burner 3 be periodically changed to change periodically the oxygen ratio, a phase difference be provided between the periodic change of the oxygen concentration and the periodic change of the oxygen ratio, and the combustion state of the burner 3 be periodically oscillated (oscillational combustion). In this way, the convection of the combustion gas by the burner 3 is generated in the ladle 10 for molten metal by burning the burner 3 in a periodic oscillation state, and the inner surface 11b of the ladle 10 for molten metal can be uniformly heated.

When the combustion state of the burner 3 is periodically oscillated, a method can be used in which the flow rate of each of the primary fuel M1, the secondary fuel M2, the primary oxygen gas G1, the secondary oxygen gas G2 and the combustion supporting gas G3 is appropriately changed by opening and closing the on-off valves 41, 42, 43, 44 and 45 provided in the flow rate control unit 4 as described above.

Here, the periodical change of the oxygen concentration means the periodical change of the oxygen concentration in the total amount of oxygen supplied to the burner 3 (total amount of oxygen contained in the air used for the primary oxygen gas G1, the secondary oxygen gas G2 and the combustion supporting gas G3).

Further, the oxygen ratio in the present embodiment is determined by the relationship between the total amount of oxygen supplied to the burner 3 and the supply amount of the fuel fluid (the primary fuel M1 and the secondary fuel M2). The oxygen ratio refers to an equivalent ratio obtained by dividing the total amount of oxygen supplied to the burner 3 by the amount of theoretical oxygen necessary to completely combust the primary fuel M1 and the secondary fuel M2. Therefore, theoretically, the state of oxygen ratio 1.0 is a state in which complete combustion can be performed using just enough oxygen.

The amount of theoretical oxygen required when using LNG as the fuel fluid is approximately 2.3 times that of LNG in molar ratio, although it depends on the composition of LNG.

Furthermore, in the present embodiment, when there is a difference between the periodic change of the flow rate of the primary fuel M1 and the secondary fuel M2 and the periodic change of the oxygen concentration and the oxygen ratio, the effect of suppressing the generation of nitrogen oxide (NOx) generated at the time of combustion of the burner 3 is also obtained.

As described above, when the increase rate of the oxygen gas in the combustion supporting gas G3 supplied to the burner 3 is increased in synchronization with the temperature increase of the ladle 10 for molten metal, which is the object to be heated, it is possible to prevent the heat transfer efficiency (radial heat transfer efficiency or convective heat transfer efficiency) from the burner 3 to the object to be heated (the ladle 10 for molten metal) from being reduced. This makes it possible to heat the object to be heated efficiently.

The radiation heat transfer is represented, for example, by the following equation (1).

$$Q = \varepsilon \sigma (T_f^4 - T_s^4) \qquad (1)$$

Here, each symbol in the formula (1) is each value shown below.

Q: heat transfer amount
E: emissivity
Σ: Stefan Boltzmann constant
$T_f$: temperature of flame
$T_s$: temperature of object to be heated Moreover, the convective heat transfer is represented by following formula (2), for example.

$$Q = h(T_f - T_s) \qquad (2)$$

Here, each symbol in the formula (2) is each value shown below

Figure 6:
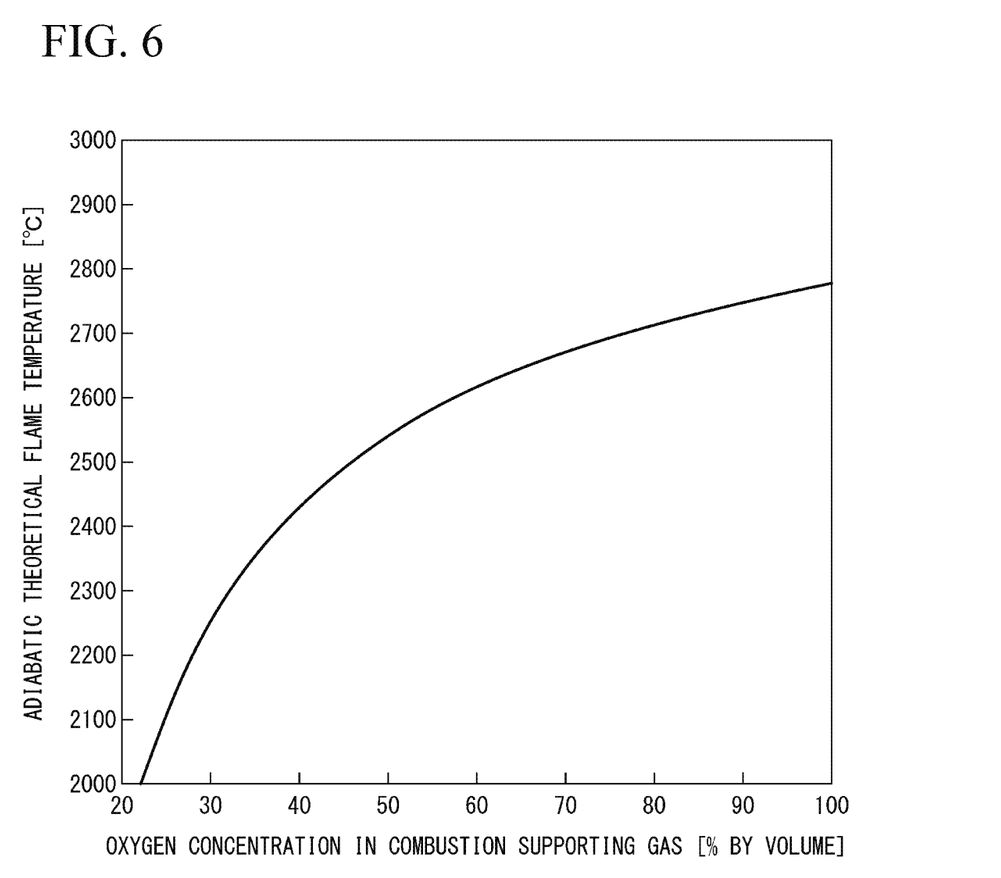
FIG. 6 is a figure for typically illustrating one embodiment of the method and the device for heating an object to be heated according to the present invention, and is a graph for showing a relationship between an oxygen concentration in a combustion supporting gas and an adiabatic theoretical flame temperature.

Q: heat transfer amount
H: heat transfer coefficient
$T_f$: temperature of flame
$T_s$: temperature of object to be heated Further, the relationship between the oxygen concentration in the combustion supporting gas G3 and the temperature of the flame 2 is, for example, a relationship as shown in the graph of FIG. 6. FIG. 6 is a graph showing the relationship between the oxygen concentration in the combustion supporting gas G3 and the adiabatic theoretical flame temperature.

In the graph shown in FIG. 6, as the oxygen concentration in the combustion supporting gas G3 increases, the temperature of the flame 2 also increases in a gentle curve. When the oxygen concentration is 100% by volwne, the adiabatic theoretical tlarrfe temperature is about 2,780° C., By heating the object to be heated by the method for heating an object to be heated, the oxygen concentration in the combustion supporting gas G3 supplied to the burner 3 becomes higher as the temperature of the object to be heated becomes higher. Therefore, the heat transfer efficiency is improved, and as a result, the fuel supply amount of the burner 3 is reduced. Therefore, it is preferable that the burner 3 used by this embodiment have a large adjustment range of the flow volume of the fuel fluid (the primary fuel M1 and the secondary fuel M2). As described above, in order to increase the adjustment range of the flow rate of the fuel fluid, it is required to configure the burner 3 so as to maintain a stable combustion state regardless of the magnitude of the flow rate of the fuel fluid.

Therefore, as described above, the primary fuel supply pipe 31 for supplying the primary fuel M1 is disposed on the central axis of the burner 3, and the secondary fuel supply pipe 32 for supplying the secondary fuel M2 is disposed to surround the periphery of the primary fuel supply pipe 31 in the burner 3 used in the present embodiment. Thus, for example, when the flow rate of the fuel fluid (the primary fuel M1 and the secondary fuel M2) is small, the fuel fluid can be supplied using only the primary fuel supply pipe 31. In contrast, when the flow rate of the fuel fluid is large, the fuel fluid can be supplied using the secondary fuel supply pipe 32 in addition to the primary fuel supply pipe 31. By configuring the burner 3 as described above, it is possible to further improve the stability of the formation state of the flame 2, that is, the combustion state. The presence or absence of the fuel fluid supply to the primary fuel supply pipe 31 and the secondary fuel supply pipe 32 can be controlled by the flow rate control unit 4.

As described above, when there is only one fuel fluid supply pipe, the cross-sectional area of the fuel fluid supply pipe is constant. For this reason, when the amount of fuel fluid supplied to the burner decreases, the flow velocity of the fuel fluid decreases, which may result in the flame being not stably formed. On the other hand, in the present embodiment, it is possible to form a stable flame 2 regardless of the flow rate and the flow rate of the fuel fluid by using the burner 3 provided with the center supply pipe 30 having the above configuration.

<Function and Effect>

As explained above, according to the method for heating an object to be heated of the present embodiment, it is possible to heat the ladle 10 for molten metal uniformly in a short time by gradually increasing the oxygen concentration in the combustion supporting gas G3 supplied to the burner 3, and increasing the temperature rising rate of the ladle 10 for molten metal, which is the object to be heated. As a result, the generation of carbon dioxide and nitrogen oxides (NOx) can be significantly reduced, and the ladle 10 for molten metal can be dried and heated efficiently and in an environmentally friendly manner.

Moreover, according to the device 1 for heating an object to be heated of this embodiment, since the device includes the arithmetic processing unit 5 which arithmetically processes the combustion state of the burner 3, and the flow rate control unit 4 which gradually increases the oxygen concentration in the combustion supporting gas (33 supplied to the burner 3 to increase the temperature rising rate of the ladle 10 for molten metal, it is possible to heat the ladle 10 for molten metal uniformly in a short time. As a result, it is possible to provide the device 1 for heating which can significantly reduce the generation of carbon dioxide, nitrogen oxides, and the like, and the ladle 10 for molten metal can be dried and heated efficiently and in an environmentally friendly manner.

INDUSTRIAL APPLICABILITY

The method and the device for heating an object to be heated according to the present invention can uniformly heat the object to be heated in a short time as compared with the conventional method, and significantly reduce the generation of carbon dioxide, nitrogen oxides, etc. Therefore, when the present invention is applied to, for example, preheating the molten pig iron pan and the molten steel pan (ladle) for transporting the molten pig iron or the molten steel in the pig iron manufacturing plant or the steel manufacturing plant, it is possible to dry and heat efficiently and in an environmentally friendly manner without damage to the refractory bricks provided on the inner surface of the ladle. For this reason, the present invention is very suitable for such applications.

EXPLANATION OF SIGN

1 device for heating an object to be heated
2 flame
3 burner
3A burner block
3B burner block fixing jig
30 center supply pipe
31 primary fuel supply pipe
31$a$ outlet
31$b$ supply port
32 secondary fuel supply pipe
32$a$ outlet
32$b$ supply port
33 primary oxygen gas supply pipe
33$a$ outlet
33$b$ supply port
34 secondary oxygen gas supply pipe
34$a$ outlet
34$b$ supply port
35 combustion supporting gas supply pipe
35$a$ outlet
35$b$ supply port
4 flow rate control unit
41, 42, 43, 44, 45 on-off valve
5 calculation unit
6 temperature measuring unit
61 detecting device
62 thermometer
71, 72, 73, 74, 75 pipe
10 ladle for molten metal (object to be heated)
11 container main body
11$a$ opening
11$b$ inner surface
12 furnace cover
M1 primary fuel (fuel fluid)
M2 secondary fuel (fuel fluid)
G1 primary oxygen gas

The invention claimed is:

1. A method for heating an object to be heated, the method comprising:
measuring a temperature of the object to be heated;
supplying a fuel fluid and a combustion supporting gas to a burner to produce a flame that heats the object to be heated; and
adjusting an oxygen concentration in the combustion supporting gas supplied to the burner based on the measured temperature of the object to be heated,
wherein the oxygen concentration in the combustion supporting gas is increased as the temperature of the object to be heated increases to prevent a heat transfer efficiency between the flame and the object to be heated from decreasing as the temperature of the object to be heated increases.

2. The method for heating an object to be heated according to claim 1, wherein a combustion state of the burner is a periodic oscillation state by gradually increasing the oxygen concentration in the combustion supporting gas supplied to the burner with periodical changes, periodically changing at least one of a flow rate of the fuel fluid and a flow rate of the combustion supporting gas, periodically changing an equivalent ratio obtained by dividing a total amount of oxygen supplied to the burner by an amount of theoretical oxygen required to combust the fuel fluid completely, and providing a phase difference between the periodic change of the oxygen concentration and the periodic change of the equivalent ratio.

3. The method for heating an object to be heated according to claim 2, wherein a phase difference is provided between a periodic change of the flow rate of the fuel fluid and a periodic change of the oxygen concentration and the equivalent ratio.

4. The method for heating an object to be heated according to claim 1, wherein the object to be heated is a ladle or a tundish used in a steel manufacturing process.

5. A device configured to heat an object to be heated, the device comprising:
a burner configured to combust a fuel fluid and a combustion supporting gas to heat the object to be heated, the burner comprising:
a center supply pipe disposed along a central axis of the burner and configured to supply the fuel fluid and a primary oxygen gas, the center supply pipe comprising:
a primary fuel supply pipe which is disposed on the central axis of the burner:
a secondary fuel supply pipe which is disposed to surround the primary fuel supply pipe; and
a primary oxygen gas supply pipe which is disposed to surround the secondary fuel supply pipe; and
at least one combustion supporting gas supply pipe which is concentrically arranged around the center supply pipe and is configured to supply combustion supporting gas;
a flow rate control unit configured to control a flow rate of the fuel fluid, a flow rate of the combustion supporting gas, and a flow rate of oxygen gas supplied to the burner;
a temperature measuring unit installed in the object to be heated; and
a calculation unit configured to perform arithmetic processing based on a temperature measured by the temperature measuring unit to generate combustion information and transmit the combustion information to the flow rate control unit,
wherein the flow rate control unit is configured to:
selectively increase or decrease a flow rate of the fuel fluid and the combustion supporting gas based on the combustion information input from the calculation unit, to increase a temperature of the object to be heated, and
maintain or increase a heat transfer efficiency between the flame and the object to be heated as the temperature of the object to be heated increases by selectively increasing or decreasing the flow rate of the fuel fluid and the combustion supporting gas to increase an oxygen concentration in the combustion supporting gas supplied to the burner based on the temperature measured by the temperature measuring unit so that the oxygen concentration in the combustion supporting gas increases with an increase in the temperature of the object to be heated.

6. The device of claim 5, wherein the flow rate control unit is configured to control a combustion state of the burner to be a periodic oscillation state by gradually increasing the oxygen concentration in the combustion supporting gas supplied to the burner while periodically changing at least one of the flow rate of the fuel fluid and the flow rate of the combustion supporting gas, periodically changing an equivalence ratio, which is obtained by dividing a total amount of oxygen supplied to the burner by an amount of theoretical oxygen necessary to completely combust the fuel fluid, and providing a phase difference between a periodic change of the oxygen concentration and a periodic change of the equivalence ratio.

7. The device of claim 5, wherein the flow rate control unit is configured so that when supplying the fuel fluid to the burner as a primary fuel and a secondary fuel, the flow rate control unit controls supply of the primary fuel to the primary fuel supply pipe at a constant flow rate, and supply of the secondary fuel to the secondary fuel supply pipe such that the flow rate of the secondary fuel is increased.

8. The device of claim 5, wherein the flow rate control unit is configured so that when supplying the fuel fluid to the burner as a primary fuel and a secondary fuel, the flow rate control unit controls supply of the secondary fuel to the secondary fuel supply pipe at a constant flow rate, and supply of the primary fuel to the primary fuel supply pipe such that the flow rate of the primary fuel is increased.

9. The device of claim 5, wherein an outlet of the primary oxygen gas supply pipe is disposed at a position projecting in a flame ejection direction from an outlet of the primary fuel supply pipe and the secondary fuel supply pipe of the center supply pipe in the burner.

10. The device of claim 5, wherein the at least one combustion supporting gas supply pipe in the burner is configured receive air and a secondary oxygen as the combustion supporting gas.

* * * * *